(12) United States Patent
Adams (10) Patent No.: US 10,116,633 B2
(45) Date of Patent: Oct. 30, 2018

(54) SYSTEMS AND DEVICES FOR HARDENED REMOTE STORAGE OF PRIVATE CRYPTOGRAPHY KEYS USED FOR AUTHENTICATION

(71) Applicant: BANK OF AMERICA CORPORATION, Charlotte, NC (US)

(72) Inventor: Amanda J. Adams, Flint (GB)

(73) Assignee: BANK OF AMERICA CORPORATION, Charlotte, NC (US)

( * ) Notice: Subject to any disclaimer, the term of this patent is extended or adjusted under 35 U.S.C. 154(b) by 175 days.

(21) Appl. No.: 15/267,403

(22) Filed: Sep. 16, 2016

(65) Prior Publication Data
US 2018/0083932 A1 Mar. 22, 2018

(51) Int. Cl.
| | |
|---|---|
| H04L 9/32 | (2006.01) |
| H04L 29/06 | (2006.01) |
| G06F 12/14 | (2006.01) |
| H04W 12/04 | (2009.01) |
| H04W 12/06 | (2009.01) |
| G06F 21/78 | (2013.01) |
| H04L 9/08 | (2006.01) |

(52) U.S. Cl.
CPC ...... *H04L 63/0435* (2013.01); *G06F 12/1408* (2013.01); *G06F 21/78* (2013.01); *H04L 9/0891* (2013.01); *H04L 63/061* (2013.01); *H04L 63/08* (2013.01); *H04L 63/0815* (2013.01); *H04W 12/04* (2013.01); *H04W 12/06* (2013.01); *G06F 2212/1052* (2013.01)

(58) Field of Classification Search
CPC .............. H04L 63/0435; H04L 63/061; H04L 63/0815; G06F 12/1408; G06F 2212/1052; H04W 12/04; H04W 12/06
USPC .......................................................... 713/171
See application file for complete search history.

(56) References Cited

U.S. PATENT DOCUMENTS

| | | |
|---|---|---|
| 4,877,475 A | 10/1989 | Uchida et al. |
| 6,078,888 A | 6/2000 | Johnson |
| 6,175,921 B1 | 1/2001 | Rosen |

(Continued)

FOREIGN PATENT DOCUMENTS

| | | |
|---|---|---|
| EP | 1374473 A1 | 1/2004 |
| JP | 2004530346 A | 9/2004 |

OTHER PUBLICATIONS

Steve H. Weingart; Physical Security Devices for Computer Subsystems: A Survey of Attacks and Defenses; IBM.com; p. 302-317.*

*Primary Examiner* — Monjur Rahim
(74) *Attorney, Agent, or Firm* — Michael A. Springs; Moore & Van Allen PLLC; James C. Edwards (57) ABSTRACT

The invention provides for systems and devices for hardened remote storage of private cryptography keys used for authentication. The storage device is tamper-responsive, such that receipt of a signal that indicates physical or non-physical tampering with the storage device or its components results in deletion of the private cryptography key(s) from the memory. The storage device is configured to be separate and remote from a computing node that executes an authentication routine requiring the private cryptography key(s) and, as such, the private cryptography key(s) are accessible to, but not communicated to, the computing node only when the computing node is executing the authentication routine.

22 Claims, 3 Drawing Sheets

(56) References Cited

U.S. PATENT DOCUMENTS

| | | |
|---|---|---|
| 6,272,631 B1 | 8/2001 | Thomlinson et al. |
| 6,317,829 B1 | 11/2001 | Van Oorschot |
| 6,327,578 B1 | 12/2001 | Linehan |
| 6,370,250 B1 | 4/2002 | Stein |
| 6,393,565 B1 | 5/2002 | Lockhart et al. |
| 6,968,456 B1 | 11/2005 | Tripathi et al. |
| 7,047,405 B2 | 5/2006 | Mauro |
| 7,124,170 B1* | 10/2006 | Sibert .................. G06F 12/145 709/216 |
| 7,328,350 B2 | 2/2008 | Hird |
| 7,487,365 B2 | 2/2009 | England et al. |
| 7,634,085 B1 | 12/2009 | Sahai et al. |
| 8,108,317 B2 | 1/2012 | Siegler |
| 2002/0141575 A1 | 10/2002 | Hird |
| 2002/0169979 A1 | 11/2002 | Zimmer |
| 2005/0055557 A1* | 3/2005 | Yamada ................. G06F 21/32 713/186 |
| 2005/0114639 A1 | 5/2005 | Zimmer |
| 2005/0117418 A1 | 6/2005 | Jewell et al. |
| 2009/0006724 A1* | 1/2009 | Chang .................... G06F 21/10 711/103 |
| 2010/0217977 A1* | 8/2010 | Goodwill ................ G06F 21/78 713/167 |
| 2010/0250940 A1* | 9/2010 | Kitagawa ........... H04N 1/32117 713/171 |
| 2011/0246790 A1* | 10/2011 | Koh ........................ G06F 21/32 713/193 |
| 2012/0102334 A1* | 4/2012 | O'Loughlin ............ G06F 21/57 713/189 |
| 2013/0046973 A1* | 2/2013 | Resch .................... H04L 9/085 713/156 |
| 2013/0227286 A1* | 8/2013 | Brisson ................ H04L 63/062 713/168 |
| 2013/0283038 A1* | 10/2013 | Kulkarni ............... H04L 63/065 713/153 |
| 2015/0143105 A1* | 5/2015 | Perrine ............... H04L 63/0471 713/153 |
| 2016/0380767 A1* | 12/2016 | Hayashi ................... H04L 9/14 380/45 |

\* cited by examiner

SYSTEMS AND DEVICES FOR HARDENED REMOTE STORAGE OF PRIVATE CRYPTOGRAPHY KEYS USED FOR AUTHENTICATION

FIELD OF THE INVENTION

The present invention is related to storage of private cryptography keys and, more specifically, systems and devices for hardened, remote storage of private cryptography keys used for authentication.

BACKGROUND

Authentication routines that rely on private cryptography keys as a basis for proving the identity of a user are typically stored locally (i.e., on the same computing device that executes the authentication routine). While the internal file that stores the private cryptography keys on the computing device is typically password protected, the password serves as the only layer of protection. Since most computing devices, such as personal computers, laptop computers and mobile communication devices are frequently, and in some instances continuously, connected to a wired and/or wireless public network, such as the Internet or the like, internally stored private cryptography keys are continuously susceptible to being misappropriated by an entity that desires to usurp a user's identity.

Many external storage devices exist that provide for various security features associated with securing the data stored thereon. However, while many of the devices may provide for acquiring evidence of a security breach (i.e., physical or non-physical tampering with the device and/or the data), such devices do not provide for real-time response to such breaches, such that misappropriation of private cryptography keys is prevented.

Therefore, a need exists for a secure means for storing private cryptography keys. The desired storage means should reduce the risk of misappropriation of keys due to the keys being stored internally within a computing node that is frequently or, in some instances, continuously accessible via a public communication network, such as the Internet. Moreover, the desired storage means should provide for real-time responsiveness to tampering, such that misappropriation of the private cryptography keys is prevented.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for a hardened storage device that remotely stores private cryptography keys used for authentication. The hardened nature of the storage device provides for real-time tamper-responsiveness, such that detection of a tamper-related event prompts automatic and immediate deletion of the private cryptography keys from the memory. Moreover, the stand-alone/external storage device eliminates the need to store the keys on the computing device that performs the authentication and/or the process requiring authentication and makes the keys only available to the computing device when needed (i.e., at the time of authentication), thereby lessening the exposure of the keys to misappropriation by unauthorized users.

A system for hardened remote storage of private cryptography keys and authentication defines first embodiments of the invention. The system includes a storage device, which, according to specific embodiments of the system, may take the form of a wallet and/or a token. The storage device includes a first computing platform. The computing platform includes a first memory that is configured to store one or more private cryptography keys and a first processor in communication with the first memory. The first processor is configured to (i) generate the one or more private cryptography keys, (ii) provide for the private cryptography keys to be accessible to a computing node, while the computing node is executing an authentication routine without having to communicate the private cryptography keys to the computing node, and (iii) in response to receiving one or more tamper-related signals, delete the one or more private cryptography keys from the first memory.

The system additionally includes a computing node, such as a PC, laptop, mobile communication device or the like, which is remote from the storage device. The computing node includes a second computing platform that comprises a second memory configured to store the authentication routine, and a second processor in communication with the second memory. The second processor is configured, in response to sending data to the storage device, receive a verification result from the storage device, and execute the authentication routine to authenticate a user based at least in part on the verification result. In specific embodiments of the system, the authentication routine is conducted as part of a crypto-currency transaction, a blockchain transaction or the like.

In specific embodiments of the system, the storage device further includes one or more sensors in communication with the first processor. In such embodiments of the system, the first processor is further configured to, in response to receiving the tamper-related signals from the one or more sensors, delete the one or more private cryptography keys from the first memory. In further related specific embodiments of the system, the storage device further comprises a multi-component housing. In such embodiments of the system, the one or more sensors are configured to detect separation of at least two components of the housing and the first processor is further configured to, in response to receiving the tamper-related signal that indicates that the at least two components of the housing are separated, delete the one or more private cryptography keys from the first memory. In other related specific embodiments of the system, the storage device further comprises one or more fasteners, such as mechanical or chemical fasteners, configured to hold together at least two of the components of the housing. In such embodiments of the system, the one or more sensors are configured to detect movement or a break in one or more of the fasteners, and wherein the first processor is further configured to, in response to receiving the tamper-related signal that indicates movement of and/or a break in one of the fasteners, delete the one or more private cryptography keys from the first memory.

In other specific related embodiments of the system, the one or more sensors further comprise at least one of a shock sensor, an acceleration sensor and a temperature sensor, In such embodiments of the system, the first processor is further configured to, in response to receiving the tamper-related signals from at least one of the shock sensor, the acceleration sensor and the temperature sensor, delete the one or more private cryptography keys from the first memory.

In other specific embodiments of the system, the first processor is further configured to receive the tamper-related signal, from the computing node. In such embodiments of the system, the tamper-related signal indicates that a user has exceeded a predetermined number of attempts of inputting user authentication credentials to the authentication routine.

In other specific embodiments of the system, the first processor is further configured to receive user configurations that define at least one of (i) the one or more tamper-related signals that result in deletion of the one or more private cryptography keys from the first memory, and (ii) thresholds for one or more tamper-related signals. According to specific embodiments of the invention, the user configurations may be received from (i) an entity designated as an administrator, such as a storage device provider or (ii) a user in possession of the storage device (i.e., the individual/user requiring authentication).

In other specific embodiments of the system, the storage device further includes at least one of a short-range wireless communication module (e.g., NFC, BLUETOOTH® or the like) or a physical communication connector (e.g., Universal Serial Bus (USB) connector or the like). In such embodiments of the system, the first processor is further configured to communicate with the computing node via one of short-range wireless communication or a physical communication connection. In specific related embodiments of the system, the first processor is further configured to receive the tamper-related signal, from the computing node, such that the tamper-related signal indicates an occurrence of an attempt to intercept or otherwise attack the short-range wireless communication between the storage device and the computing node.

In still further specific embodiments of the invention, the first processor is further configured to generate and output, in a specified order, a plurality of mnemonic words associated with one of (i) a seed used to create one of the private cryptography keys, or (ii) one of the private cryptography keys. In related embodiments of the invention, the first processor is further configured to receive an input of mnemonic words in a specified order, and, in response to the input, re-generate (i) a seed used to create one of the private cryptography keys or (ii) the private cryptography key associated with the mnemonic words. In this regard, the creation and output mnemonic words and, subsequent specified order input of the mnemonic words on another storage device, allow for the private cryptography key(s) to be re-generated in the event that that the storage device is lost or misappropriated.

In other specific embodiments of the system, the first processor is further configured to generate the one or more private cryptography keys based on a hierarchal deterministic approach. In this regard, in the event that the underlying process associated with the authentication necessitates a different key for each process, only the initial private cryptography key is required to be backed-up, since subsequent keys are determined/derived from the initial key.

A hardened remote storage device for storing and communicating private cryptography keys used for authentication defines second embodiments of the invention. The storage device comprises a memory configured to store one or more private cryptography keys, and a processor in communication with the memory. The processor is configured to (i) generate the one or more private cryptography keys, (ii) provide for the private cryptography keys to be accessible to a remote computing node, while the computing node is executing an authentication routine without having to communicate the private cryptography keys to the remote computing node, and (iii) in response to receiving one or more tamper-related signals, delete the one or more private cryptography keys from the first memory.

In specific embodiments the device further includes one or more sensors in communication with the first processor. In such embodiments of the device, the processor is further configured to, in response to receiving the tamper-related signals from the one or more sensors, delete the one or more private cryptography keys from the first memory. In specific related embodiments the device further includes a multi-component housing that encloses the processor and the memory. In such embodiments of the device, the one or more sensors are configured to detect separation of at least two components of the housing and the processor is further configured to, in response to receiving the tamper-related signal that indicates that the at least two components of the housing are separated, delete the one or more private cryptography keys from the first memory. In other elated specific embodiments the device includes one or more fasteners configured to hold together at least two of the components of the housing, and wherein the one or more sensors are configured to detect movement of one or more of the fasteners, and wherein the processor is further configured to, in response to receiving the tamper-related signal that indicates movement of at least one of the fasteners, delete the one or more private cryptography keys from the first memory.

In other related specific embodiments of the device, the one or more sensors further include at least one of a shock sensor, an acceleration sensor and a temperature sensor. In such embodiments of the device, the processor is further configured to, in response to receiving at least one of the tamper-related signals from at least one of the shock sensor, the acceleration sensor and the temperature sensor, delete the one or more private cryptography keys from the first memory.

In further specific embodiments of the device, the processor is further configured to receive the tamper-related signal, from the computing node, wherein the tamper-related signal indicates that a user has exceeded a predetermined number of attempts of inputting user authentication credentials to an authentication routine that requires at least one of the private cryptography keys.

In still further specific embodiments of the device, the processor is further configured to receive user configurations that define at least one of (i) the one or more tamper-related signals that result in deletion of the one or more private cryptography keys from the first memory, and (ii) thresholds for one or more tamper-related signals. According to specific embodiments of the invention, the user configurations may be received from (i) an entity designated as an administrator, such as a storage device provider or (ii) a user in possession of the storage device (i.e., the individual/user requiring authentication).

In yet other specific embodiments the device includes at least one of (i) a short-range wireless communication module, such as NFC, BLUETOOTH® or the like, or (ii) a physical communication connector, such as a USB connector or the like. In such embodiments of the device, the processor is further configured to communicate with the remote computing node via one of short-range wireless communication or a physical communication connection. Moreover, in related further embodiments of the device, the processor is further configured to receive the tamper-related signal, from the computing node. In such embodiments of the device, the tamper-related signal indicates an occurrence of an attempt to intercept or otherwise attack the short-range wireless communication between the storage device and the computing node.

In yet other specific embodiments of the device, the processor is further configured to generate and output, in a specified order, a plurality of mnemonic words associated with one of (i) a seed used to create one of the private cryptography keys, or (ii) one of the private cryptography keys. In related embodiments of the device, the processor is further configured to receive an input of mnemonic words in a specified order, and, in response to the input, re-generate (i) a seed used to create one of the private cryptography keys, or (ii) one of the private cryptography keys, associated with the mnemonic words. In this regard, the creation and output mnemonic words and, subsequent specified order input of the mnemonic words on another storage device, allow for the private cryptography key(s) to be re-generated in the event that that the storage device is lost or misappropriated.

Thus, systems, apparatus, methods, and computer program products herein described in detail below provide for systems and devices for secure storage of private cryptography keys. Specifically, the invention provides for a hardened storage device that responds, in real-time, to tamper signals by deleting the private cryptography keys stored in the memory. Moreover, the external/remote nature of the storage device provides for the private cryptography keys to only be accessible, without having to communicate the keys, to a remote computing node while the node is executing an authentication routine, thereby limiting the exposure of the private authentication keys to misappropriation or the like.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal allocation. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Thus, embodiments of the present invention provide for a hardened storage device that remotely stores private cryptography keys used for authentication. The hardened nature of the storage device provides for real-time tamper-responsiveness, such that detection of a tamper-related event prompts immediate deletion of the private cryptography keys from the memory. Moreover, the stand-alone/external storage device eliminates the need to store the keys on the computing node that performs the authentication and/or the process requiring authentication and provides for the keys to be accessible to the computing node, without having to communicated the keys to the computing node, when needed (i.e., at the time of authentication), thereby lessening the exposure of the keys to misappropriation by unauthorized users.

In specific embodiments of the invention, the external storage device may be configured to communicate with the authenticating computing node (e.g., PC, laptop, mobile communication device or the like) via short-range wireless communication (e.g., Near Field Communication (NFC), BLUETOOTH® or the like) or via a physical communication channel/connector (e.g., a Universal Serial Bus (USB) connector or the like). In such embodiments of the invention the external storage device may take the form of a USB flash drive, a wallet or a token, such as a key ring token or the like.

According to specific embodiments of the invention, the storage device includes one or more sensors that are configured to detect physical actions at the device that are, or may be, associated with tampering of the device. For example, in specific embodiments of the invention, in which the components of the storage device are encased in a multi-part housing, the sensors may be configured to detect a separation, or a separation by a predetermined distance, of two or more of the parts of the housing. In another example of a specific embodiments of the invention, in which the parts of the housing are held in place by mechanical (e.g., screws or the like) or chemical (e.g., adhesive) fasteners, the sensors may be configured to detect a movement or a break, or a movement/break by a predetermined amount, in the fasteners. In further embodiments of the invention, the sensors may comprise shock sensors, acceleration sensors and/or temperature sensors, such that a predetermined amount of shock, acceleration or temperature or a predetermined combination of amounts of two or more of shock, acceleration and temperature results in deletion of the private cryptography keys from the memory.

In other embodiments of the invention, the storage device is responsive to tamper signals being communicated from the computing node (e.g., PC, laptop, mobile communication device or the like) executing the authentication routine and/or the underlying process/transaction associated with the authentication routine. For example, the computing node may detect a predetermined number of unsuccessful attempts of inputting user credentials (e.g., password, biometric data or the like) or the computing node may detect an attempt at intercepting or otherwise attacking short-range wireless communication between the storage device and the computing node.

In other specific embodiments of the invention, the storage device is user and/or administrator configurable, such that a user or administrator may define settings for the storage device. The settings may include, but are not limited to, the tamper signals that prompt deletion of the keys from memory, the threshold amounts, quantities, distances of a tamper signal that prompt deletion of keys from memory and the like.

In still further embodiments of the invention, the storage device provides means for backing-up and re-creating the private cryptography keys. Such backing-up and recreation of the private cryptography keys on another storage device may be necessary if the original storage device is lost or stolen and the underlying process/transaction is private-key-specific (i.e., the process/transaction cannot occur in the absence of the designated private cryptography key). In such embodiments of the invention, the storage device may configured to generate and output a plurality of ordered mnemonic words, which are associated in code with (i) the seed used to generate the private cryptography key or (ii) the private cryptography key itself. Additionally, the storage device is configured to receive input of the mnemonic words and, in response to receiving the input, in the designated order, re-create the private cryptography key. In other embodiments of the invention, the storage device is configured such that back-up may be accomplished by having a back-up device transmit its public key to the storage device, which in response, encrypts the seed used to generate the private key or the encrypts the private key itself and communicating the encrypted private key to the back-up device.

Figure 1:
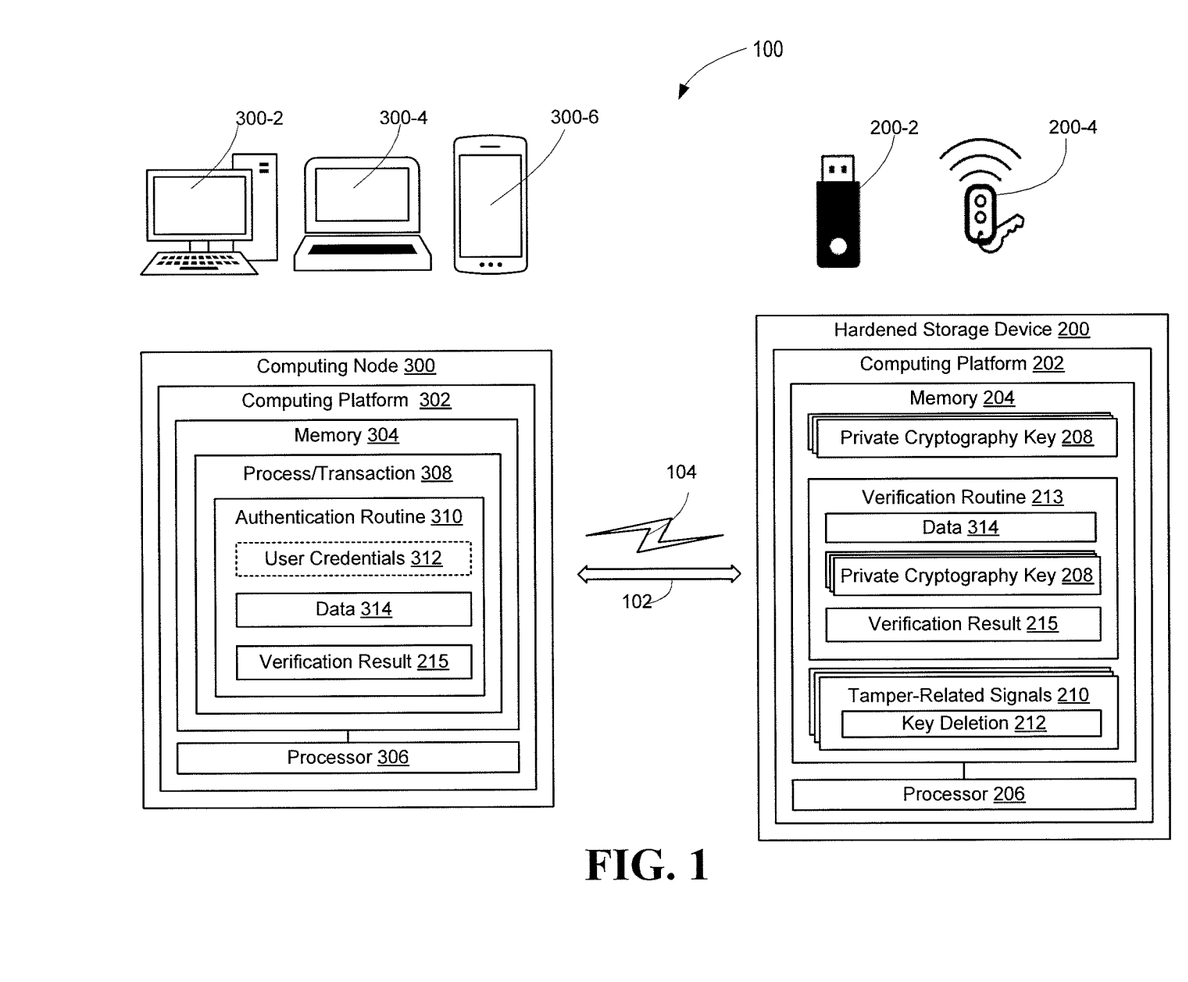
FIG. 1 provides a block diagram of a system for storing private cryptography keys remotely in a hardened storage device and conducting processes/transactions requiring private key authentication in a remote computing node, in accordance with embodiments of the present invention.

Referring to FIG. 1, a block diagram is shown of a system 100 for remote hardened storage of private cryptography keys and associated authentication using the private keys, in accordance with embodiments of the present invention. The system comprises a hardened storage device 200 and a computing node 300. In specific embodiments of the invention, the hardened storage device 200 may take the form of, but is not limited to, a Universal Serial Bus (USB) flash drive device 200-2 or a token (e.g., key fob or the like) 200-4 capable of short-range wireless communication. In other embodiments of the invention, storage device 200 may include both a physical connection connector (e.g., USB connector) and a short range wireless communication mechanism (e.g., NFC, BLUETOOTH®, WIFI® or the like), such that communication between the storage device 200 and the computing node 300 may occur via the physical connection or short-range wireless communication depending on which type of communication/connection the computing node 300 is configured for.

The computing node 300 may take the form of any computing device that is configured to conduct a process/transaction 308 that requires authentication (i.e., requires the private cryptography key(s) 208 for authentication). In such embodiments, the computing node 300 will be configured to include public network connectivity, either wired, wireless or both to allow for the computing node 300 to connect to the Internet or another public network. Examples, of computing nodes 300 include, but are not limited to, a personal computer (PC) 300-2, a portable/laptop computer 300-4, a mobile communication device/smart telephone 300-6 or the like.

The hardened storage device 200 includes a computing platform 2002 having a memory 204 and a processor 206 in communication with the memory. The processor 206 is configured to generate and store, in memory 204, one or more private cryptography keys 208. In addition, the processor 206 is configured to provide for the private cryptography keys 208 to be accessible to the computing node 300, without having to communicate the communicate the keys 208 to the computing node 300, on an as needed basis (i.e., while a user is conducting a process/transaction 308 on the computing node 300 that requires authentication and/or while the authentication routine 310 is executing on the computing node 300).

Additionally, the processor 206 of storage device 200 is configured to receive tamper-related signals 210 and, in response to receiving the tamper-related signals 210, delete 214 the private cryptography keys 208 from the memory 204 of the storage device 200. Such deletion 214 of the private cryptography keys 208 from the memory 204 in response to tamper-related signals insures that the private keys are not misappropriated.

In addition, system 100 includes computing node 300 which includes a computing platform 302 having a memory 302 and a processor 306 in communication with the memory. The memory stores an authentication routine 310 that is configured to prove the identity of a user based on the private cryptography key(s) 208 and, in some embodiments of the invention, user credentials 312 (i.e., a user passcode/password, biometric data or the like). In specific embodiments of the invention the authentication routine 310 is executed in conjunction with (or is part of) a process or transaction 308 requiring authentication. In specific embodiments of the invention, the process/transaction 308 may be a crypto-currency transaction (e.g., BITCOIN® or the like) and/or a public ledger-type transaction (e.g., a blockchain-type transaction or the like).

In specific embodiments of the invention, once the computing node 300 and the storage device 200 are in communication, the computing node 300 communicates data 314 to the storage device 300 that is required to be processed with the private cryptography key 208. In those embodiments of the invention in which the communication channel is a wireless communication channel, an encrypted or otherwise secure tunnel connection may be established between the computing node 300 and the storage device 200. In response to receiving the data 314 from the computing node 300, the storage device executes routine 213 that uses the private cryptography key 208 to verify the data 314 and generates and communicates a verification result 215 back to the computing node 300 that is implemented in the authentication process. In this regard, processing requiring the private cryptography key(s) 208 occurs at the storage device 200 and the private cryptography key(s) 208 are not communicated to the computing node.

Figure 2:
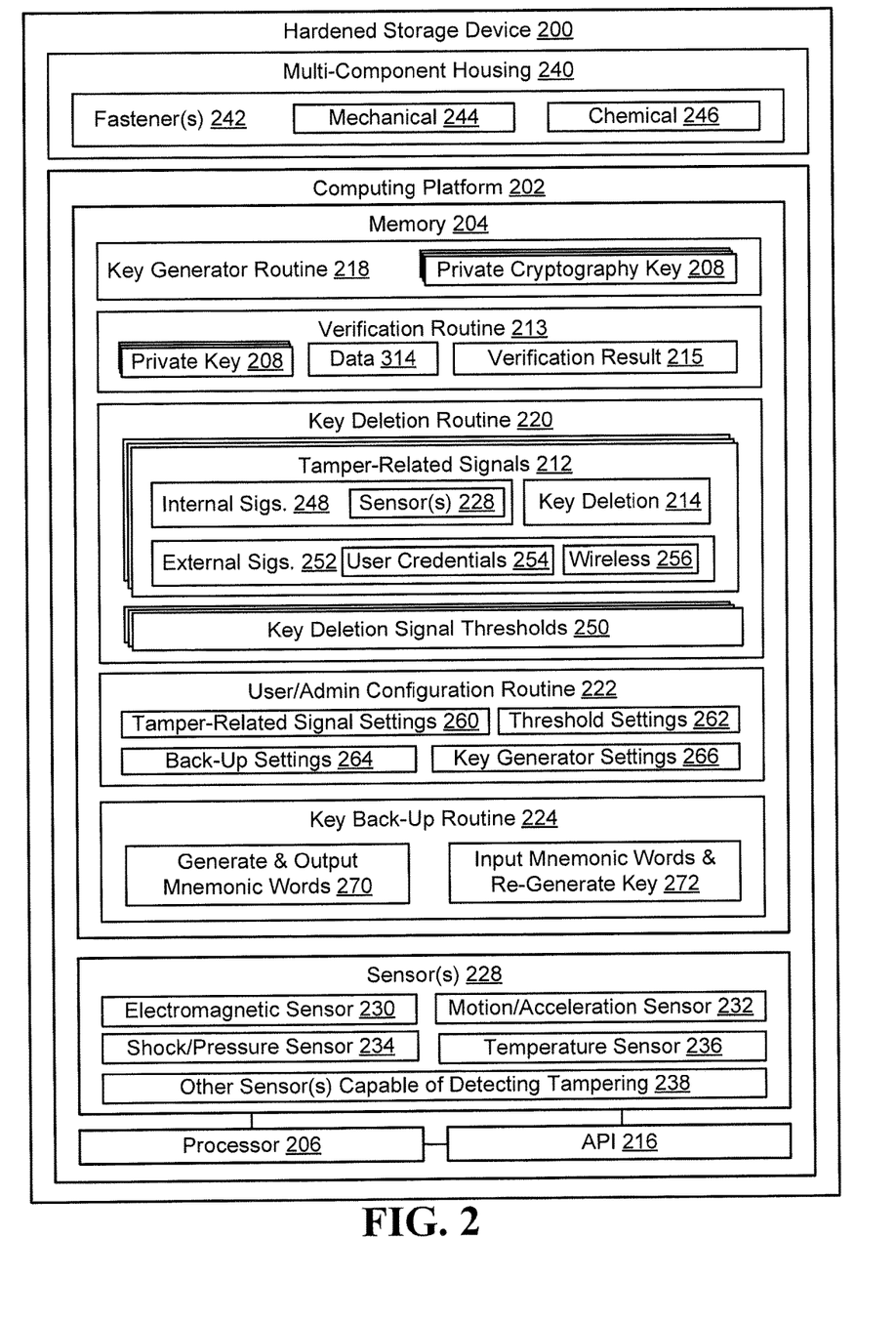
FIG. 2 provides a block diagram of a hardened storage device configured to store private cryptography key(s) and, in response to receiving a tamper-related signal, automatically delete the private key(s) from storage, in accordance with embodiments of the present invention.

Referring to FIG. 2 a more detailed block diagram is presented of the hardened storage device 200, in accordance with additional embodiments of the invention. As previously noted, the storage device 200 includes a computing platform 202 that can execute algorithms, such as routines, applications and the like. Computing platform 202 includes memory 204, which may comprise volatile and non-volatile memory, such as read-only and/or random-access memory (RAM and ROM), EPROM, EEPROM, flash cards, or any memory common to computer platforms. Moreover, memory 204 may comprise cloud storage, such as provided by a cloud storage service and/or a cloud connection service.

Further, computing platform 202 also includes processor 206, which may be an application-specific integrated circuit ("ASIC"), or other chipset, logic circuit, or other data processing device. Processor 206 may execute an application programming interface ("API") 216 that interfaces with any resident programs, such as key generator routine 218, key deletion routine 220, user/administrator configuration routine 222, and key back-up routine 224 and sub-routines associated therewith or the like stored in the memory 204 of the hardened storage device 200.

Processor 206 may include various processing subsystems (not shown in FIG. 1) embodied in hardware, firmware, software, and combinations thereof, that enable the functionality of storage device 200 and the operability of the storage device 200 on a short-range wireless network. For example, processing subsystems allow for initiating and maintaining communications and exchanging data with other networked devices. For the disclosed aspects, processing subsystems of processor 206 may include any subsystem used in conjunction with key generator routine 218, key deletion routine 220, user/administrator configuration routine 222, and key back-up routine 224 and related sub-routines, algorithms, sub-algorithms, modules, sub-modules thereof.

Computer platform 202 may additionally include a short-range wireless communications module (not shown in FIG. 2) embodied in hardware, firmware, software, and combinations thereof, that enables short-range wireless communications between the storage terminal and the computing nodes 200 (shown in FIG. 1). The short-range wireless communications module may comprise a Near Field Communication (NFC) module operating in the 13.56 MHz unlicensed radio frequency band, a BLUETOOTH® module operating in the 2.4-2.485 GHz frequency band, ZIGBEE® module operating in the 2.4-2.485 GHz frequency band, Infrared (IrDa) module operating in the 800-100 micrometer band or the like. Thus, communication module may include the requisite hardware, firmware, software and/or combinations thereof for establishing and maintaining a short-range wireless communication connection. In addition to, or in lieu of, the short-range wireless communications module, the computing platform 202 may additionally include a physical connector (not shown in FIG. 2), such as a USB connector or the like that is configured to be received by a corresponding USB port located on the computing node 300. As previously discussed, the short-range wireless communications module and/or physical connector serve as the communication mechanism for communication between the storage device 200 and the computing node 300.

Memory 204 of hardened storage device 200 includes key generator routine 218 that is configured to implement processor 206 to generate one or more private cryptography keys 208. In specific embodiments of the invention, the key generator routine 218 is a random number generator that generates a number of consisting of a predetermined number of digits (e.g., a twelve (12) digit string or the like). In specific embodiments of the invention, the hardened storage device 200 may include an input mechanism (e.g., push button) (not shown in FIG. 2) or the like for triggering the key generator routine 208 to initiate generation of private cryptography key(s) 208. In other embodiments of the invention, the key generator routine 208 may be configured to receive a communication from an auxiliary device (e.g., mobile communication device or the like) that requests generation of the private cryptography keys 208.

In specific embodiments of the invention, the key generator routine 218 may employ a hierarchical deterministic chain approach, such that an initial private cryptography key (i.e., a seed) is generated and all subsequently generated keys are derived (using, for example, BIP32 features or the like) from the seed. Specific transactions that rely on the private cryptography key 208 for authentication (e.g., crypto-currency, public ledger/blockchain and the like), require a different private cryptography key for each transaction since, for anonymity purposes, the wallet address changes each time a transaction occurs. In those embodiments of the invention in which the key generator routine 208 implements the hierarchical deterministic chain approach, only the initial/first private cryptography key needs to be stored in backed-up storage (in case the storage device is lost or stolen as discussed in more detail infra.), since the subsequently generated private cryptography key can be re-created from the initial/first private cryptography key/seed. As such, the hierarchical deterministic chain approach eliminates the need to perform a back-up procedure each time a new private cryptography key is generated.

Additionally, the key generator routine 218 may, in specific embodiments of the invention, implement a validation mechanism to insure that the generated private cryptography key/seed is sufficiently "strong". In the event that the private cryptography key/seed is determined be weak (i.e., vulnerable to attack or de-coding), a secondary algorithm may be applied to the private cryptography key/seed to insure that key/seed is sufficiently "strong".

In specific embodiments of the invention, the storage device 200 includes one or more verification routines 213 that are configured to receive data 314 from a computing node in communication with the storage device 200 and use one or more of the private cryptography keys 208 to verify the data 314 and generate and communicate a verification result 215 back to the computing node 300 that is implemented in the authentication process. In this regard, processing requiring the private cryptography key(s) 208 occurs at the storage device 200 as opposed to the remote computing node (300 of FIG. 1) and, as such, the private cryptography key(s) 208 are not required to be communicated to the computing node. Since the private cryptography key(s) 208 are not required to be communicated to the computing node, the invention adds further security to key protection, in that, the keys are, at no time, held in the memory of the computing node.

Additionally, memory 204 stores key deletion routine 220 that is configured to implement processor 206 to receive tamper-related signals 212 and, in response to receiving the tamper-related signals 212, delete 214 the private cryptography key(s) 208 from the memory 204. In specific embodiments of the invention, the tamper-related signals 212 are internally-based signals 248 communicated from one or more sensors 228.

In a specific embodiments of the device, sensor 228 may comprise electromagnetic sensors 230. The hardened storage device 200 may, in specific embodiments, comprise a multi-component housing 240 that encases the memory and circuitry of the storage device 200. In such embodiments of the invention, the electromagnetic sensors 230 may be affixed to two or more of the housing components, such that the electromagnetic sensors 230 detect when the housing components have been separated (i.e., when the electromagnetic sensors 230 are separated by a distance at which the magnetic field is no longer sensed or has dropped below a threshold).

In other specific embodiments of the hardened storage device 200, the multi-component housing 240 may include one or more fasteners 242 that are configured to hold together the components of the housing. The fasteners 242 may be mechanical fasteners 244 (e.g., screws, snap-fit components or the like) and/or chemical fasteners 246 (e.g., adhesives). In such embodiments of the invention, the sensors 228 may include motion/acceleration sensors 232 that detect a prescribed amount of motion applied to the mechanical fasteners 244 (e.g., breaking a seal or the like) or sensors that detect a break in the chemical fasteners.

Additionally, sensors 228 may include shock/pressure sensors 234, temperature sensors 236 and any other sensors 238 capable of detecting tampering of the device. Shock/pressure sensors 234 and/or motion/accelerometer sensors 232 may be implement to detect when the storage device 200 has been subjected to a significant impact that would damage (e.g., break/shatter the housing), or otherwise expose the memory component of the storage device 200. Temperature sensors 236 may be implemented to detect when the device has been subjected to temperatures which render other sensors inactive or inoperable (e.g., temperatures below a predetermined level). In specific embodiments of the invention, deletion 214 of the private cryptography keys 208 may occur based on receiving a signal that meets or exceeds a threshold 250 from any one of the aforementioned sensors, while in other embodiments of the invention, a predetermined combination of signals from two or more sensors may be required to result in deletion 214 of the of the private cryptography keys 208.

Additionally, tamper-related signals 212 may include externally-generated signals 252 received by storage device 200. The external signals 252, may include, but are not limited to, a predetermined number of failed attempts at inputting user credentials 254 into the authentication routine 310 at the computing node 300 or an attempt to intercept 256 or otherwise attacking the short-range wireless communication between the storage device 200 and the computing node 300.

As previous discussed, the key deletion routine 220 may implement key deletion signal thresholds 208, such that the signals received must indicate the predetermined threshold amount of what is being sensed in order for deletion of the private cryptography keys to occur. In other embodiments of the invention, the sensors 228 themselves are configured to only communicate signals when the requisite predetermined threshold amount has been met.

In other embodiments of the invention, the storage device 200 includes user/administrator configuration routine 222 that provides for a user and/or an administrator to configure various different settings of the storage device 200. The configurable settings may include, but are not limited to, tamper-related signal settings 260, threshold settings 262, back-up settings 264 and key generator settings 344. Tamper-related signal settings 260 may include which sensors 228 are activated/deactivated. Threshold settings 262 include the amount required to delete the private cryptography keys (e.g., five failed user credential inputs needed to result in deletion of the private keys or the like). Back-up settings 264 may include configuration of mnemonic words and key generator settings 266 may include whether the hierarchal deterministic chain approach is used. The configuration routine 222 may be configured such that different designated roles (i.e., administrator, user and the like) define which settings the designate role may configure or reconfigure. The administrator role may be designated to the entity that provides the storage device to an individual, while the user is the individual to whom the device is given (i.e., the individual requiring identity authentication). In specific embodiments of the invention, only the administrator is granted authority to define (at the time of deployment) or change (after deployment) the settings within the configuration routine 222. While in other embodiments of the invention, the user may be granted authority to change (after deployment) the settings or change certain designated settings or change certain designated settings by a prescribed amount. For example, only the administrator can change back-up settings 264 and/or key generator settings 266, while the user may additionally change certain prescribed tamper-related signal settings 260 and the threshold settings 262 to a certain prescribed degree.

In additional embodiments of the device 200, the memory 204 stores back-up routine 224 that is configured to assist the user in backing up the storage of the private cryptography keys 208. Backing up the private cryptography keys 208 is instrumental in the event that the storage device 200 is lost or stolen and the transaction 308 is specifically tied to a designated private cryptography key 208 (e.g., crypto-currency is "tied" to a specific private cryptography key 208, such that the currency cannot be used absent the associated private cryptography key 208). In specific embodiments of the invention, the back-up routine 224 is configured to generate and output 270 a plurality of mnemonic words, which are coded variants of the seed/private cryptography keys 208. Since each mnemonic word is representative of a segment of the seed/private key 208, the number of mnemonic words is dependent upon the number of characters in the seed/private cryptography keys 208. In addition, the order in which the mnemonic words are output is significant, since the order is representative of overall seed/private cryptography keys 208 and, as such, the mnemonic must subsequently be inputted in the same order in which they are outputted in order to subsequently re-create the seed/private cryptography keys 208. In specific embodiments of the invention, the storage device 200 may be configured to include an input mechanism (e.g., push button or the like) (not shown in FIG. 2) for a user to request mnemonic words and a display for outputting, in rotating fashion, the mnemonic words. Once outputted, the user may manually write-down the mnemonic words and store them in a physical place or in another computing device's memory. In alternate embodiments of the invention, the mnemonic words, once generated may be communicated to an auxiliary device for output and/or storage in the auxiliary device.

Additionally, in specific embodiments of the invention, the back-up routine 224 is configured to receive an input 272 of the mnemonic words and in response to receiving the input, re-generate 272 and store the private cryptography key 208. Due to size limitations on the storage device input mechanisms (keypads or the like) may not be feasible, as such the mnemonic words may be inputted on an auxiliary device (e.g., mobile communication device or the like) and subsequently communicated to the storage device. For the purpose of understanding the concept of back-up, it should be noted that storage device 200 on which the mnemonic words are generated and outputted 270 is typically different from the storage device 200, which is referred to herein as the back-up storage device, on which the mnemonic words are subsequently inputted and private keys recreated. For example, the storage device 200 on which the mnemonic words are generated and outputted 270 may be a user's original device, which is subsequently lost or stolen, prompting the need for the user to acquire another storage device (i.e., the back-up storage device), on which the mnemonic words are inputted and private keys recreated.

In alternate embodiments of the invention, back-up may be accomplished by having the back-up storage device transmit, either via a wired or wireless connection, a public key to the original storage device. In response to receiving the back-up storage device's public key, the original storage device encrypts the private cryptography key/seed using the public key and communicates the encrypted private cryptography key/seed to the back-up storage device.

Figure 3:
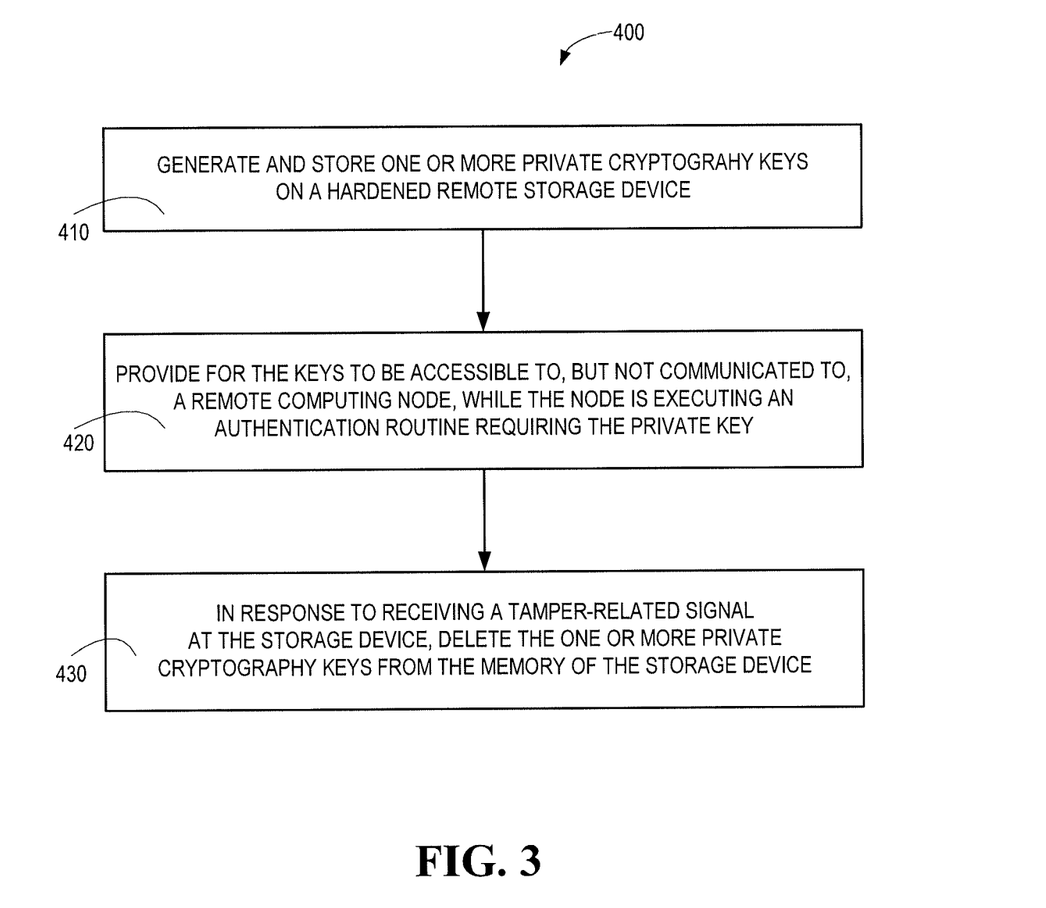
FIG. 3 provides a flow diagram of a method for generating private cryptography keys in a hardened remote storage device, conducting authentication remotely using the private keys and in response to receiving a tamper-related signal at the storage device, deleting the private cryptography keys from the memory, in accordance with embodiments of the present invention.

Referring to FIG. 3 a flow diagram is depicted of a method 400 for storing a private cryptography key(s) on a hardened storage device, providing access to the key(s) to a remote computing node for authentication purposes without having to communicate the key(s) to the remote computing node and, in response to detecting a tamper-related action, automatically deleting the private cryptography key(s) from the memory of the storage device, in accordance with embodiments of the present invention.

At Event 410, one or more private cryptography keys are generated on a hardened storage device that is remote from computing nodes that use the private cryptography keys for authentication purposes. According to specific embodiments of the invention, the private cryptography keys and/or original seed is generated at the request of the user (i.e., the individual whose identity is being authenticated) as opposed to the administrator of the storage device (i.e., the entity that provides the storage device to the user). Generation of the private keys and/or original seed at the request of the user provides added security to the user that the private keys are secure. In one specific embodiment of the invention, the storage device is configured with an input mechanism (e.g., push button or the like), which is engaged by a user to initiate generation of the private key/seed. In other embodiments of the invention, in which the storage device may or may not be configured with an input mechanism, the user may access an auxiliary device (e.g., mobile communication device or other computing device) that is in networked communication with the storage device and provide a request to initiate generation of private keys.

In specific embodiments of the invention, the private cryptography keys are generated using a hierarchical deterministic chain approach, in which the initial private cryptography key/seed is generated randomly and subsequently generated private keys are derived from the preceding private cryptography key/seed. Use of the hierarchical deterministic chain approach is instrumental in those embodiments of the invention in which the underlying process/transaction associated with the authentication requires a different private cryptography key for each separate process/transaction. For example, in crypto-currency transactions the wallet address changes for each transaction and, therefore, a different private key is needed for each transaction. By using a hierarchical deterministic chain approach, the user only needs to back-up the initial private cryptography key/seed (as opposed to backing-up each time a new private key is generated if each key were randomly generated) and, as needed, all of the subsequently derived private keys can be regenerated, using the hierarchical deterministic chain approach, on another storage device (i.e., a back-up storage device).

According to other specific embodiments of the invention, once the initial private cryptography key is generated, or at any point in time thereafter, the private cryptography key may be backed-up. Backing-up the private cryptography key is instrumental to protect against a lost or stolen device in those instances in which the existing private cryptography key is tied to the process/transaction (e.g., crypto-currency is connected with a private key, such that, the crypto-currency cannot be used absent the associated private key). In specific embodiments of the invention, the storage device is configured to generate and output an ordered sequence of mnemonic words that provide a coded variant of the private cryptography key. In addition, the storage device is configured to receive a subsequent input of the previously generated mnemonic words, which in turn prompts re-generation of the private cryptography key(s) on the storage device. In other alternate embodiments of the invention, back-up may be accomplished by having the back-up storage device transmit, either via a wired or wireless connection, a public key to the original storage device. In response to receiving the back-up storage device's public key, the original storage device encrypts the private cryptography key/seed using the public key and communicates the encrypted private cryptography key/seed to the back-up storage device.

At Event 420, a remote computing node is provided access to the private cryptography keys while the node is executing an authentication routine. In this regard, the computing node is able to perform authentication without having the keys communicated from the storage device to the computing node. In specific embodiments of the invention, in response to executing an authentication routine, the computing node will communicate data requiring verification to the storage data and the storage device will execute one or more routines that verify the data through implementation of one or more of the private cryptography key(s) and generate and communicate a verification result back to the computing node. By limiting storage of the private key(s) on a hardened remote storage device, as opposed to the computing node on which the process/transaction occurs, the private key is less susceptible to network attack/misappropriated, since the private key is only stored at the storage device and is only available to the computing node at the time of the process/transaction.

At Event 430, in response to the storage device receiving a tamper-related signal, the storage device automatically deletes the private cryptography keys from the memory. In specific embodiments of the invention the tamper-related signals may internal signals (i.e., signals emanating from the storage device) and or external signals (i.e., signals emanating from the computing node implementing the process/transaction requiring authentication or from another external device, such as an external attempting to mount the storage device or the like). In this regard, the storage device may be configured with various sensors that detect tamper-related actions performed to the storage device. For example, sensors may be configured to detect separation of components of the storage device housing and/or movement of mechanical fasteners (e.g., screws or the like) or breaks in chemical fasteners (e.g., breaks in adhesive bonds or the like). In other embodiments of the invention, the sensors may be configured to detect movement (e.g., high rate of speed/acceleration) or impact to the device that would indicate an attempt to damage or otherwise gain access to the interior components of the storage device. In other embodiments of the invention, the sensor may detect temperature below a pre-determined threshold indicative of attempt to deactivate other sensors on the device.

External signals may include, but are not limited to, signals from the computing node indicating occurrence of a predetermined number of failed attempts at entering user credentials (e.g., passwords, biometrics or the like) to the authentication routine, or signals communicated from the computing node and or another device indicating that another device is attempting to mount the storage device and/or attempting to intercept wireless communication between the storage device and the computing node.

In specific embodiments of the invention, the user and/or an administrator may authorized to configure various settings of the storage device, including activating/deactivating sensors, defining and/or changing sensor/tamper-related signal thresholds, defining or changing private key generation settings and/or defining or changing back-up settings.

Thus, systems, apparatus, methods, and computer program products described above provide for systems and devices for secure storage of private cryptography keys. Specifically, as described in detail above the invention provides for a hardened storage device that responds, in real-time, to tamper signals by deleting the private cryptography keys stored in the memory. Moreover, the external/remote nature of the storage device provides for the private cryptography keys to only be accessible to, but not communicated to, remote computing devices when an authentication routine is executing, thereby limiting the exposure of the private authentication keys to misappropriation or the like.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for hardened remote storage of private cryptography keys and authentication, the system comprising:
   a storage device comprising a first computing platform including:
      a first memory configured to store one or more private cryptography keys, and
      a first processor in communication with the first memory, wherein the first processor is configured to:
         receive user configuration inputs that define (i) one or more tamper-related signals and (ii) a threshold amount for each of the one or more tamper-related signals, wherein meeting or exceeding the threshold amount results in deletion of the one or more private cryptography keys from the first memory,
         generate the one or more private cryptography keys,
         provide for the private cryptography keys to be accessible to a computing node in communication with the storage, while the computing node is executing an authentication routine without having to communicate the private cryptography keys to the computing node, and
         in response to receiving at least one of the one or more tamper-related signals and determining that the threshold amount associated with the at least one of the tamper-related signals has been met or exceeded, delete the one or more private cryptography keys from the first memory; and
   the computing node that is remote from the storage device and comprising a second computing platform including:
      a second memory configured to store the authentication routine, and
      a second processor in communication with the second memory, wherein the second processor is configured to, in response to sending data to the storage device, receive a verification result from the storage device, and execute the authentication routine to authenticate a user based at least in part on the verification result.

2. The system of claim 1, wherein the storage device further includes one or more sensors in communication with the first processor, wherein the first processor is further configured to, in response to receiving the tamper-related signals from the one or more sensors, delete the one or more private cryptography keys from the first memory.

3. The system of claim 2, wherein the storage device further comprises a multi-component housing and wherein the one or more sensors are configured to detect separation of at least two components of the housing, wherein the first processor is further configured to, in response to receiving the tamper-related signal that indicates that the at least two components of the housing are separated, delete the one or more private cryptography keys from the first memory.

4. The system of claim 3, wherein the storage device further comprises one or more fasteners configured to hold together at least two of the components of the housing, and wherein the one or more sensors are configured to detect movement of one or more of the fasteners, and wherein the first processor is further configured to, in response to receiving the tamper-related signal that indicates movement of at least one of the fasteners, delete the one or more private cryptography keys from the first memory.

5. The system of claim 2, wherein the one or more sensors further comprise at least one of a shock sensor, an acceleration sensor and a temperature sensor, wherein the first processor is further configured to, in response to receiving at least the tamper-related signals from at least one of the shock sensor, the acceleration sensor and the temperature sensor, delete the one or more private cryptography keys from the first memory.

6. The system of claim 1, wherein the first processor is further configured to receive the tamper-related signal, from the computing node, wherein the tamper-related signal indicates that a user has exceeded a predetermined number of attempts of inputting user authentication credentials to the authentication routine.

7. The system of claim 1, wherein the storage device further comprises at least one of a short-range wireless communication module or a physical communication connector, wherein the first processor is further configured to communicate with the computing node via one of short-range wireless communication or a physical communication connection.

8. The system of claim 7, wherein the first processor is further configured to receive the tamper-related signal, from the computing node, wherein the tamper-related signal indicates an occurrence of an attempt to intercept the short-range wireless communication communicated between the storage device and the computing node.

9. The system of claim 1, wherein the first processor is further configured to generate and output, in a specified order, a plurality of mnemonic words associated with one of (i) a seed used to create one of the private cryptography keys, or (ii) one of the private cryptography keys.

10. The system of claim 1, wherein the first processor is further configured to receive an input of mnemonic words in a specified order, and, in response to the input, re-generate (i) a seed used to create one of the private cryptography keys or (ii) the private cryptography key associated with the mnemonic words.

11. The system of claim 1, wherein the first processor is further configured to generate the one or more private cryptography keys based on a hierarchal deterministic approach.

12. A hardened remote storage device for storing and communicating private cryptography keys used for authentication, the device comprising:
 a memory configured to store one or more private cryptography keys; and
 a processor in communication with the memory, wherein the processor is configured to:
  receive user configuration inputs that define (i) one or more tamper-related signals and (ii) a threshold amount for each of the one or more tamper-related signals, wherein meeting or exceeding the threshold amount results in deletion of the one or more private cryptography keys from the first memory,
  generate the one or more private cryptography keys,
  provide for the private cryptography keys to be accessible to a remote computing node, while the computing node is executing an authentication routine without having to communicate the private cryptography keys to the remote computing node, and
  in response to receiving at least one of the one or more tamper-related signals and determining that the threshold amount associated with the at least one of the tamper-related signals has been met or exceeded, delete the one or more private cryptography keys from the first memory.

13. The device of claim 12, further comprising one or more sensors in communication with the first processor, wherein the processor is further configured to, in response to receiving the tamper-related signals from the one or more sensors, delete the one or more private cryptography keys from the first memory.

14. The device of claim 13, further comprising a multi-component housing that encloses the processor and the memory, wherein the one or more sensors are configured to detect separation of at least two components of the housing, wherein the processor is further configured to, in response to receiving the tamper-related signal that indicates that the at least two components of the housing are separated, delete the one or more private cryptography keys from the first memory.

15. The device of claim 14, further comprising one or more fasteners configured to hold together at least two of the components of the housing, and wherein the one or more sensors are configured to detect movement of one or more of the fasteners, and wherein the processor is further configured to, in response to receiving the tamper-related signal that indicates movement of at least one of the fasteners, delete the one or more private cryptography keys from the first memory.

16. The device of claim 14, wherein the one or more sensors further comprise at least one of a shock sensor, an acceleration sensor and a temperature sensor, wherein the processor is further configured to, in response to receiving at least one of the tamper-related signals from at least one of the shock sensor, the acceleration sensor and the temperature sensor, delete the one or more private cryptography keys from the first memory.

17. The device of claim 12, wherein the processor is further configured to receive the tamper-related signal, from the computing node, wherein the tamper-related signal indicates that a user has exceeded a predetermined number of attempts of inputting user authentication credentials to an authentication routine that requires at least one of the private cryptography keys.

18. The device of claim 12, further comprising at least one of (i) a short-range wireless communication module or (ii) a physical communication connector, wherein the processor is further configured to communicate with the remote computing node via one of short-range wireless communication or a physical communication connection.

19. The device of claim 18, wherein the processor is further configured to receive the tamper-related signal, from the computing node, wherein the tamper-related signal indicates an occurrence of an attempt to intercept the short-range wireless communication communicated between the storage device and the computing node.

20. The device of claim 12, wherein the processor is further configured to generate and output, in a specified order, a plurality of mnemonic words associated with one of (i) a seed used to create one of the private cryptography keys, or (ii) one of the private cryptography keys.

21. The device of claim 12, wherein the processor is further configured to receive an input of mnemonic words in a specified order, and, in response to the input, re-generate (i) a seed used to create one of the private cryptography keys, or (ii) one of the private cryptography keys, associated with the mnemonic words.

22. The device of claim 12, wherein the processor is further configured to generate the one or more private cryptography keys based on a hierarchal deterministic approach.

\* \* \* \* \*